US012786120B2

(12) United States Patent
Miyamoto et al.

(10) Patent No.: US 12,786,120 B2
(45) Date of Patent: Nov. 3, 2026

(54) PACKET COMMUNICATION APPARATUS, PACKET PROCESSING RULE SETTING METHOD AND PROGRAM

(71) Applicant: NTT, Inc., Tokyo (JP)

(72) Inventors: Katsuma Miyamoto, Tokyo (JP); Akihiro Kimura, Tokyo (JP); Shinya Kawano, Tokyo (JP); Koji Sugisono, Tokyo (JP); Hiroki Kano, Tokyo (JP)

(73) Assignee: NTT, Inc., Tokyo (JP)

( * ) Notice: Subject to any disclaimer, the term of this patent is extended or adjusted under 35 U.S.C. 154(b) by 761 days.

(21) Appl. No.: 18/024,707

(22) PCT Filed: Sep. 7, 2020

(86) PCT No.: PCT/JP2020/033781

§ 371 (c)(1),
(2) Date: Mar. 3, 2023

(87) PCT Pub. No.: WO2022/049768

PCT Pub. Date: Mar. 10, 2022

(65) Prior Publication Data

US 2023/0344761 A1 Oct. 26, 2023

(51) Int. Cl.
*H04L 45/745* (2022.01)
*H04L 61/103* (2022.01)
*H04L 61/5014* (2022.01)

(52) U.S. Cl.
CPC .......... *H04L 45/745* (2013.01); *H04L 61/103* (2013.01); *H04L 61/5014* (2022.05)

(58) Field of Classification Search
CPC .................................................... H04L 45/745
USPC ......................................................... 370/392
See application file for complete search history.

(56) References Cited

U.S. PATENT DOCUMENTS

| | | | |
|---|---|---|---|
| 2002/0035591 | A1 | 3/2002 | Kimura |
| 2007/0237159 | A1 | 10/2007 | Yamada et al. |
| 2019/0229989 | A1 | 7/2019 | Tsunekawa |

FOREIGN PATENT DOCUMENTS

| | | | | | |
|---|---|---|---|---|---|
| JP | 2002101120 | A | | 4/2002 | |
| JP | 2006115535 | A | | 4/2006 | |
| JP | 2007281980 | A | | 10/2007 | |
| JP | 2009049648 | A | * | 3/2009 | ........... H04L 45/243 |
| JP | 2010161499 | A | | 7/2010 | |
| JP | 2011082593 | A | | 4/2011 | |
| JP | 2017017631 | A | | 1/2017 | |
| JP | 2017098655 | A | | 6/2017 | |
| JP | 2018174395 | A | | 11/2018 | |
| JP | 2019126983 | A | | 8/2019 | |
| JP | 6692178 | B2 | * | 5/2020 | |

(Continued)

OTHER PUBLICATIONS

Cisco Systems, Inc. (2005) "Understanding Policy Routing" literature, Aug. 10, 2005 [online] website: https://www.cisco.com/c/en/us/support/docs/ip/border-gateway-protocol-bgp/10116-36.html?dtid=osscdc000283.

(Continued)

*Primary Examiner* — Sibte H Bukhari

(57) ABSTRACT

A packet communication device connected to one or more paths includes a routing unit that distributes packets received from a terminal to any one of the one or more paths, and a control unit that acquires an IP address of the terminal and sets an application rule for packet processing in the routing unit on the basis of the IP address.

14 Claims, 17 Drawing Sheets

(56) References Cited

FOREIGN PATENT DOCUMENTS

| | | | | | |
|---|---|---|---|---|---|
| KR | 20170064682 | A | * | 6/2017 | ......... H04L 67/2833 |
| WO | 2020017583 | A1 | | 1/2020 | |

OTHER PUBLICATIONS

Debian "Linux IP-Route(8)" Debian Manpages [online] Accessed on Jul. 6, 2020, website: https://manpages.debian.org/experimental/iproute2/ip-route.8.en.html.

* cited by examiner

Fig. 2

Policy based routing

```
$ ip rule list
Priority Selector Action
0:      from all lookup local
100:    from all iif eth1 lookup table100
100:    from all iif eth2 lookup table200
32766:  from all lookup main
32767:  from all lookup default

$ ip route show table table100
default via 10.0.0.1 dev tun0 proto static

$ ip route show table table200
default via 10.0.0.2 dev tun1 proto static
```

Fig. 7

| IP Address | MAC Address |
|---|---|
| 192.168.0.10 | xx:xx:xx:xx:xx:xx:xx |
| 192.168.0.20 | yy:yy:yy:yy:yy:yy:yy |
| ⋮ | ⋮ |

Fig. 8

| Entry | MAC Address | I/F |
| --- | --- | --- |
| 100 | xx:xx:xx:xx:xx:xx:xx | tun0 |
| 200 | yy:yy:yy:yy:yy:yy:yy | tun1 |
| 300 | zz:zz:zz:zz:zz:zz | tun1 |

Fig. 10

| IP Address | MAC Address | Lease time |
|---|---|---|
| 192.168.0.10 | xx:xx:xx:xx:xx:xx:xx | 180 s |
| 192.168.0.20 | yy:yy:yy:yy:yy:yy:yy | 176 s |
| ⋮ | ⋮ | |

Fig. 13

| I/F | IP Address | MAC Address |
|---|---|---|
| eth1 | 192.168.0.10 | xx:xx:xx:xx:xx:xx:xx |
| eth1 | 192.168.0.20 | yy:yy:yy:yy:yy:yy:yy |
| ⋮ | ⋮ | ⋮ |

PACKET COMMUNICATION APPARATUS, PACKET PROCESSING RULE SETTING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/033781, filed on 7 Sep. 2020, the disclosure of which is hereby incorporated herein by reference in its entirety.

TECHNICAL FIELD

The present invention relates to a technology for distributing a packet to any of one or more paths, and a technology for performing packet processing (filtering, traffic control, or the like) at the time of distribution.

BACKGROUND ART

With the recent spread of IoT devices, various IoT devices are now being connected to networks (NWs). Further, there are an increasing number of cases in which a user connects a PC to a home NW for work such as telework.

Terminals such as IoT devices and PCs are connected to customer premises equipment (CPE) included in a base. Further, the CPE is connected to one or more NWs via one or more paths, and performs processing for distributing packets from a terminal to a destination NW.

A technology for realizing packet distribution includes a technology for routing packets on the basis of an input I/F, a transmission source IP address, a port number, and the like (for example, NPL 1 and NPL 2).

CITATION LIST

Non Patent Literature

[NPL 1] Cisco, "Understanding Policy Routing" https://www.cisco.com/c/en/us/support/docs/ip/border-gateway-protocol-bgp/10116-36.html?dtid=osscdc000283

[NPL 2] Linux (registered trademark) IP-ROUTE https://manpages.debian.org/experimental/iproute2/ip-route.8.en.html

SUMMARY OF INVENTION

Technical Problem

In a base having a small NW such as a general household or SOHO, the NW in the base is generally not separated for each terminal. In such an NW, it is difficult to distinguish terminals on the basis of the input I/F, the port number, or the like, and in many cases, the transmission source IP address is dynamically changed by DHCP. Therefore, there is a problem that it is difficult to appropriately perform packet processing according to each terminal. Further, meanings of "packet processing" in the present specification include at least "packet distribution," "packet filtering" and "traffic control."

The present invention has been made in view of the above points, and an object of the present invention is to provide a technology for making it possible to appropriately perform packet processing in a packet communication device that distributes a packet received from a terminal to any of one or more paths.

Solution to Problem

According to the disclosed technology, a packet communication device connected to one or more paths includes:

a routing unit configured to distribute packets received from a terminal to any of the one or more paths; and a control unit configured to acquire an IP address of the terminal and set an application rule for packet processing in the routing unit on the basis of the IP address.

Advantageous Effects of Invention

According to the disclosed technology, packet processing can be appropriately performed in a packet communication device that distributes the packet received from the terminal to any of the one or more paths.

BRIEF DESCRIPTION OF DRAWINGS

FIG. 2 is a diagram illustrating an example of the related art.

FIG. 7 is a diagram illustrating an example of a table.

FIG. 8 is a diagram illustrating an example of a table.

FIG. 10 is a diagram illustrating Example 1.

FIG. 13 is a diagram illustrating Example 2.

DESCRIPTION OF EMBODIMENTS

Hereinafter, an embodiment of the present invention (the present embodiment) will be described with reference to the drawings. An embodiment to be described below is merely an example, and the embodiment to which the present invention is applied is not limited to the following embodiment.

RELATED ART

Figure 1:
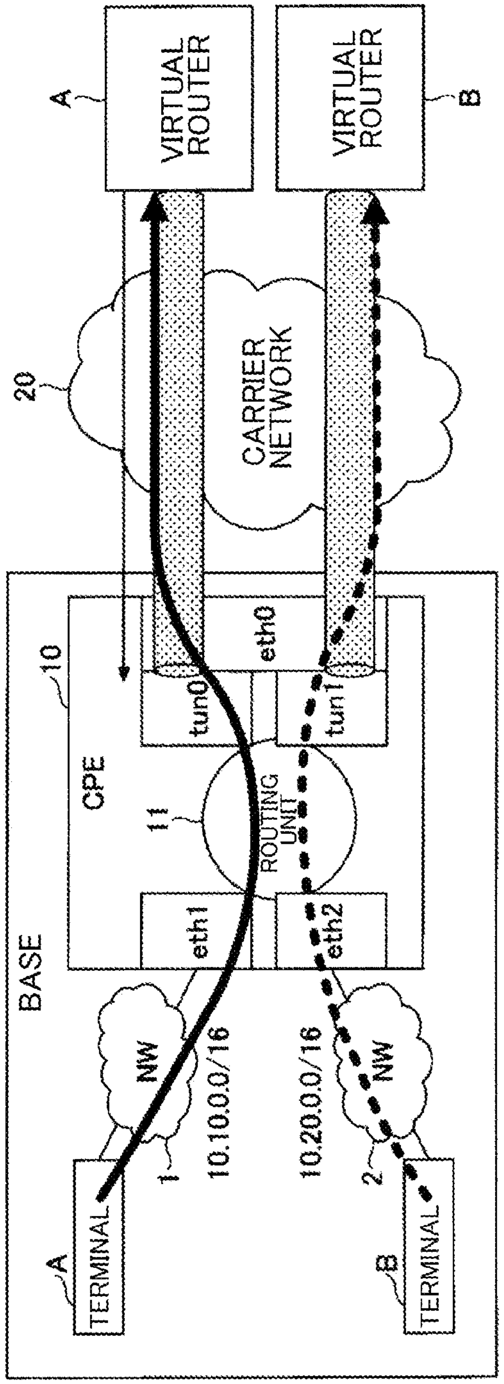
FIG. 1 is a diagram illustrating an example of a related art.

The related art will be described before a technology according to the present embodiment is described. FIG. 1 illustrates a configuration example of a communication system in a related art.

As illustrated in FIG. 1, in the present communication system, a CPE 10 is included in a base. A terminal A is connected to an interface (eth1) of the CPE 10 via an NW 1, and a terminal B is connected to an interface (eth2) of the CPE 10 via the NW 2. Hereinafter, "interface" will be written as "I/F."

The CPE 10 is connected to a virtual router A and a virtual router A via a carrier network 20. Use of a "virtual router" is an example, and a "router" may be used instead of the "virtual router." The same applies to description of the embodiment of the present invention to be described below.

Tunnels are constructed between the tunnel I/F (tun0) on eth0 of the CPE and the virtual router A, and between the tunnel I/F (tun1) and the virtual router B. The tunnel is a virtual path, and the tunnel may be called a "path." In description of the related art and the embodiment of the present invention to be described below, the tunnel may be a tunnel that encapsulates packets or may be a tunnel that does not encapsulate packets. For example, communication of a packet in a case in which QoS control or priority control is performed by imparting a DCSP value or the like to the packet may be a tunnel.

As illustrated in FIG. 1, the CPE 10 includes a routing unit 11, in addition to each I/F. The routing unit 11 can perform routing based on an input I/F of a packet, a transmission source IP address of the packet, a transmission source port number of the packet, and the like by using policy-based routing (PBR).

For example, in the routing unit 11, a tunnel I/F is designated as an output I/F of a packet having a specific transmission source IP address, making it possible to distribute the packet to the designated tunnel.

FIG. 2 illustrates an example of a routing rule of the PBR set in the routing unit 11. In the example illustrated in FIG. 2, the output I/F is determined on the basis of the input I/F of the packet.

Figure 3:
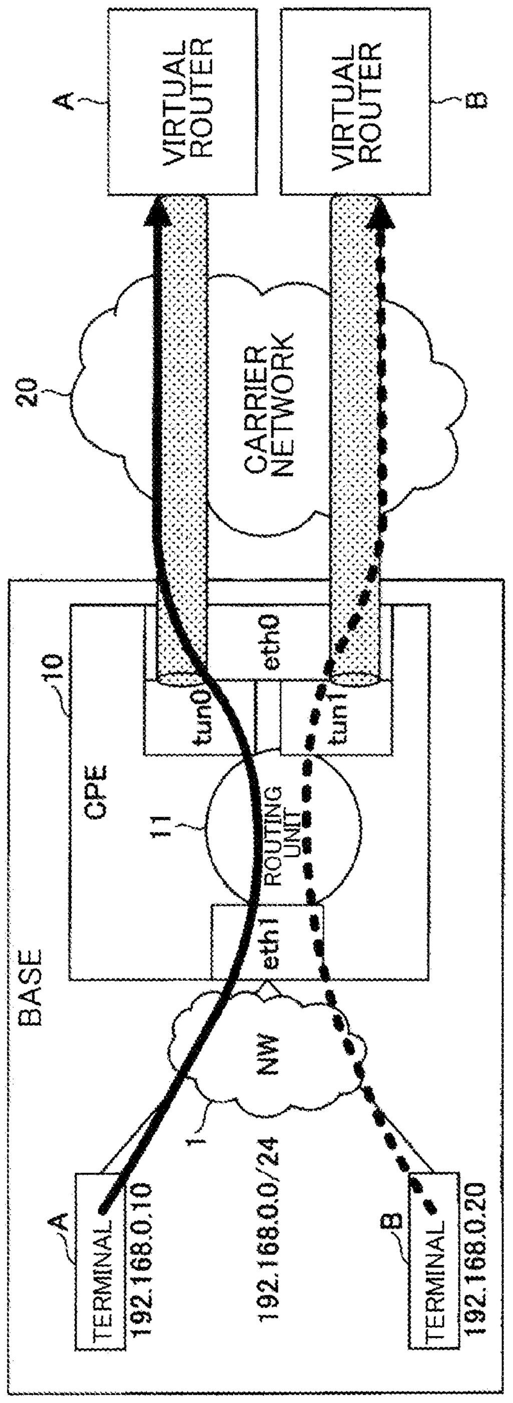
FIG. 3 is a diagram illustrating an example of the related art.

FIG. 3 illustrates another configuration example of the related art. The example illustrated in FIG. 3 has a different configuration within the base, as compared to FIG. 2.

In the example illustrated in FIG. 3, the base is assumed to be mass users, SOHO, or the like, and an NW thereof is small. A plurality of terminals belong to the same NW (NW 1) as illustrated in FIG. 3 because there are restrictions on functions and installation of the CPE or the AP. Further, IP address issuance is managed by DHCP. This configuration has the following problems.

That In the configuration illustrated in FIG. 3, because the plurality of terminals belong to the same NW, the input I/F is common among the plurality of terminals. Therefore, it becomes impossible to distribute packets for each terminal on the basis of the input I/F described with reference to FIG. 2. Further, because a subnet is also common between terminals, sorting cannot be performed by a transmission source subnet.

Further, because the IP address of the terminal is dynamically changed by DHCP, the change cannot be followed and desired packet distribution is likely to be impossible when packet distribution is performed by the transmission source IP address.

Although it is possible to roughly specify an application (APL) using a port number or a payload of the packet, this is not suitable for identification of a terminal, and it is difficult to distribute a packet for each terminal using the port number or payload.

Hereinafter, a technology capable of appropriately distributing packets even when a plurality of terminals are connected to the same NW and an IP address is dynamically changed will be described as a technology according to an embodiment of the present invention.

Configuration Example of System

Figure 4:
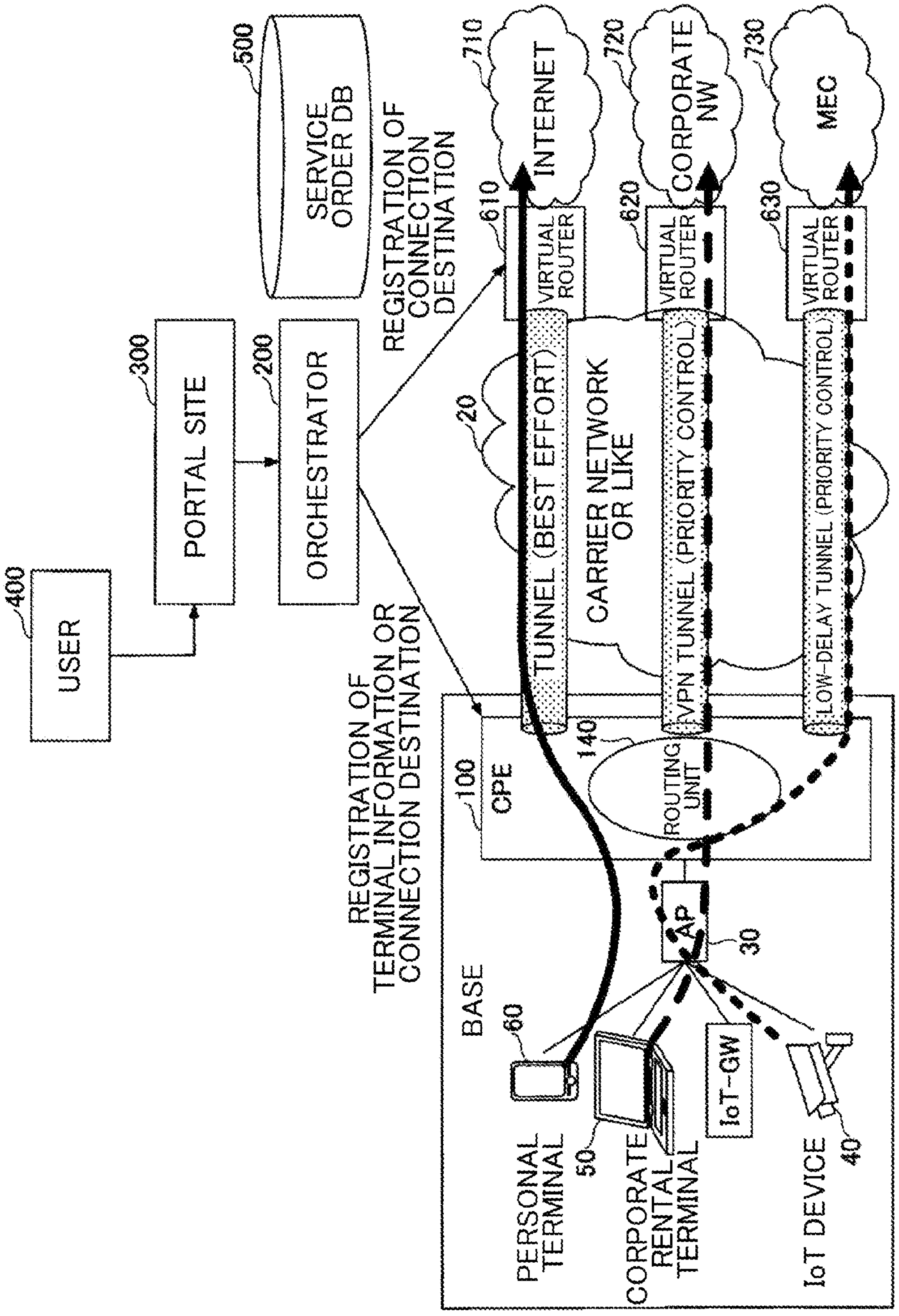
FIG. 4 is a diagram illustrating an example of an overall configuration of a system in an embodiment of the present invention.

FIG. 4 illustrates an example of an overall configuration of a communication system in the present embodiment. It is assumed that, as illustrated in FIG. 4, a base in the present communication system is a base having a small-scale NW, such as mass users or SOHO, as in the case of FIG. 3, a plurality of terminals belong to one NW, and an IP address is assigned to each terminal by DHCP.

However, such an assumption is an example, and the technology according to the present invention can be applied regardless of a configuration of the NW of the base. For example, the technology according to the present invention can also be applied to the configuration illustrated in FIG. 2.

It is assumed that the communication system in the present embodiment is a system that performs IP packet communication on Ethernet (registered trademark), and includes at least general functions such as ARP, but this assumption is an example.

As illustrated in FIG. 4, the CPE 100 is included in the base in the communication system according to the present embodiment. The CPE 100 may be referred to as an in-home customer device, a home gateway, or the like. Further, the CPE 100 may be referred to as a packet communication device.

An access point (AP) 30 is connected to the CPE 100, and terminals 40 to 60 are connected under an AP 30. The AP 30 is, for example, an access point of a wireless LAN. In FIG. 4, an IoT device 40, a corporate rental terminal 50, and a personal terminal 60 are shown as specific examples of the terminals 40 to 60.

The CPE 100 is connected to a virtual router 610, a virtual router 620, and a virtual router 630 by respective tunnels constructed on the carrier network 20. The virtual router 610 is connected to the Internet 710, the virtual router 620 is connected to a corporate NW 720, and the virtual router 630 is connected to the MEC 730.

In the example of FIG. 4, as an example, a packet from the personal terminal 60 is sent to a tunnel for best effort transfer, and is transmitted to the Internet 710 through the tunnel. Further, a packet from the corporate rental terminal 50 is sent to a VPN tunnel that performs priority control, and is transmitted to the corporate NW 720 via the tunnel. Further, a packet from the IoT device 40 is sent to a low-delay tunnel that performs priority control, and is transmitted to a network 730 for multi-access edge computing (MEC) via the tunnel.

In the present embodiment, even when the IP address is dynamically changed, the routing unit 140 of the CPE 100 can perform packet distribution for each terminal. Details of the CPE 100 enabling this will be described below.

In order to perform the above processing, an orchestrator 200 is included for registration of information in the CPE 100 or the like. Further, a service order DB 500 is included, and the orchestrator 200 can access the service order DB 500. The service order DB 500 may be included inside the orchestrator 200 or may be provided outside the orchestrator 200.

In the service order DB 500, an account name of the portal site, a service subscription situation, an IP address and API information of the CPE and the virtual router, an IP address of a VPN connection destination, I/F information (an I/F name or a setting value) of the CPE, and the like are stored for each user.

The user 400 (a terminal of the user or the like) can input setting information by accessing the portal site 300 (a Web server or the like).

That is, the user 400 accesses the portal site 300 (customer setting page, or the like) to set terminal information, service information, and the like. The terminal information is, for example, information (a MAC address, or the like) of the terminal that the user wants to set. The service information is, for example, information on a service (a VPN connection destination, priority, or the like) that the user wants to set.

For example, when the user wants to connect the corporate rental terminal 50 to a business server on the corporate NW with high priority via the VPN tunnel, the user accesses the portal site 300 to set a MAC address of the corporate rental terminal 50, a connection destination (corporate NW), and information for instructing a high-priority connection.

Setting information set by the user is sent from the portal site 300 to the orchestrator 200. The orchestrator 200 acquires user information (an IP address of the CPE, API information, authentication information, or the like) necessary for setting in the CPE 100, CPE setting input information (a tunnel interface name, DCSP value, or the like), or the like from the service order DB 500 on the basis of an account name of the user that has performed setting, the setting information input by the user, and the like, and sets terminal information (a MAC address) and CPE setting input information in the CPE 100. The information set here corresponds to association information between a terminal identifier and a connection destination, which will be described below. Necessary settings are performed on the virtual router as well.

By performing the setting in the CPE 100 or the like as described above, the user 400 can receive a service ordered via the portal site 300.

(Configuration, Operation, and the Like of CPE 100)

Figure 5:
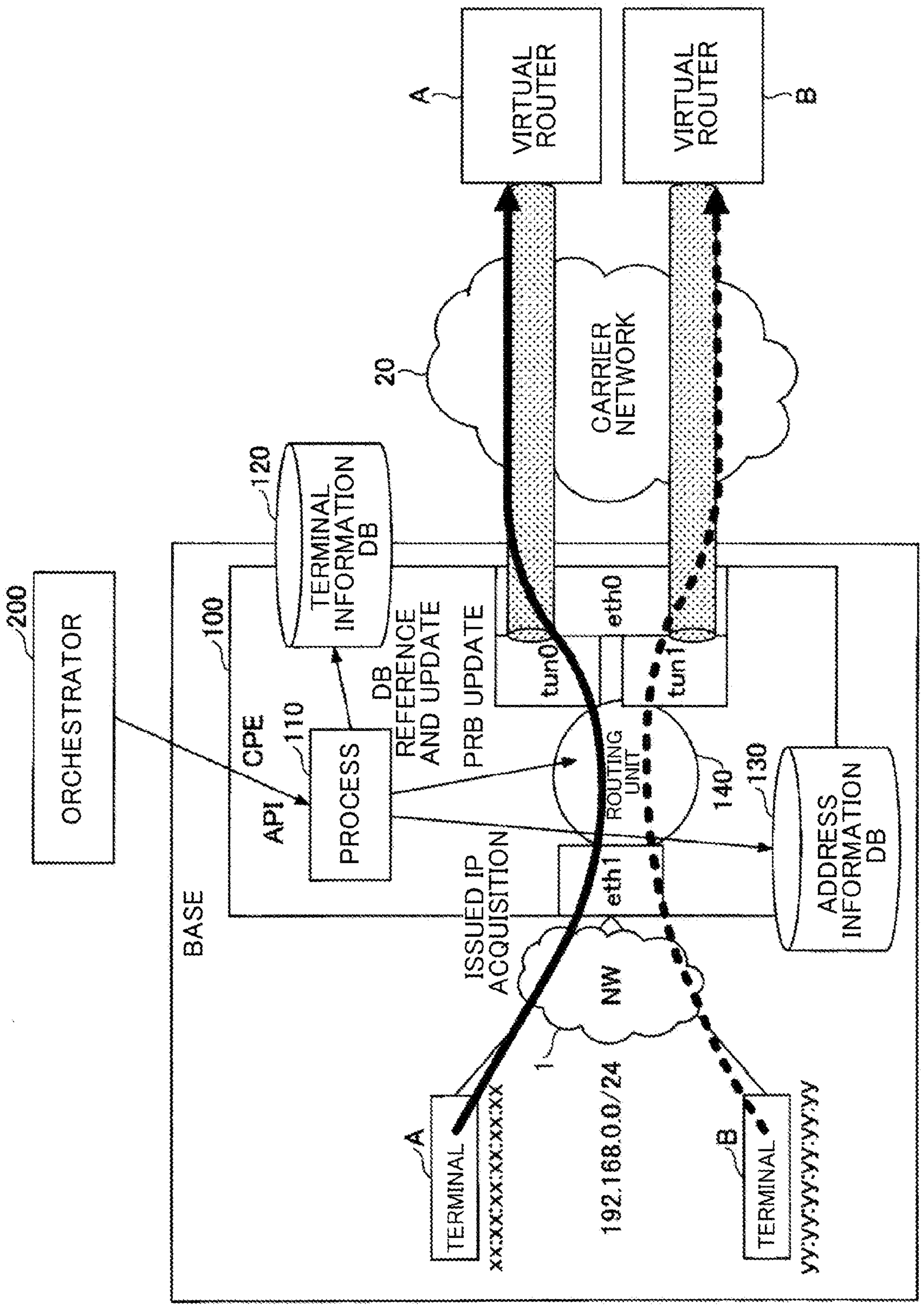
FIG. 5 is a diagram illustrating an overview of an operation of the system in the embodiment of the present invention.

FIG. 5 is a diagram illustrating a configuration example of the communication system according to the present embodiment, including an internal configuration of the CPE 100. In the example illustrated in FIG. 5, the CPE 10 is included in the base. Both the terminal A and the terminal B are connected to the I/F (eth1) of the CPE 100 via the NW 1.

Tunnels are constructed between the tunnel I/F (tun0) on eth0 of the CPE 100 and the virtual router A, and between the tunnel I/F (tun1) and the virtual router B.

As illustrated in FIG. 5, the CPE 100 includes a process 110, a terminal information DB 120, an address information DB 130, and a routing unit 140, in addition to the above-described I/F. The process 110 corresponds to a program that is executed in the CPE 100. Alternatively, the process 110 corresponds to a functional unit that is realized by executing the program in the CPE 100.

The routing unit 140 holds an application rule for packet processing, such as the routing rule of the PBR, and performs packet processing such as distribution of packets received from terminals to paths, packet filtering, and traffic control according to the application rule. The address information DB 130 is, for example, a lease table of the DHCP, an ARP table, a database of a radius server, or the like. The address information DB 130 is not limited to the lease table of the DHCP, the ARP table, the database of the radius server, and the like, and may be a table or database other than these. The address information DB 130 may be included outside the CPE 100 instead of inside the CPE 100.

The process 110 includes a REST API, and setting information from the orchestrator 200 is mediated by the REST API and input to each DB or the like. The orchestrator 200 may be set and input directly to the CPE 100 by SSH instead of the API. Processing that is executed by the process 110 will be described with reference to a flowchart of FIG. 6.

As a premise of the following processing, the address information DB 130 stores association information between the IP address of the terminal and a terminal identifier for each terminal. The association information is updated when the IP address of the terminal is changed. Further, in the routing unit 140, the routing rule of the PBR is set for each terminal on the basis of the IP address acquired by the process 110.

Using the routing rule of the PBR as the application rule for packet processing in the routing unit 140 is only an example. ACL, a filtering rule (for example, iptables, or firewall), or traffic control (for example, traffic control of Linux (registered trademark)) such as bandwidth control or priority control may be used as the application rule for packet processing in the routing unit 140. Rules other than these may be used as the application rule for packet processing in the routing unit 140. Further, the number of application rules for packet processing in the routing unit 140 may be one or may be a plurality.

It is possible to execute packet processing (permission, denial, NAPT implementation, or the like) based on a transmission source/transmission destination IP address according to a filtering rule based on an iptables command. Further, it is possible to execute packet processing (shaping, delay, order change, or the like) based on the transmission source/transmission destination IP address according to a traffic control rule based on a traffic control (tc) command.

In the present embodiment, the MAC address of the terminal is used as the terminal identifier. FIG. 7 illustrates an example of the association information stored in the address information DB 130. An example of a method of acquiring (updating) the association information between the IP address and the terminal identifier will be described in Examples 1 and 2 below.

Figure 6:
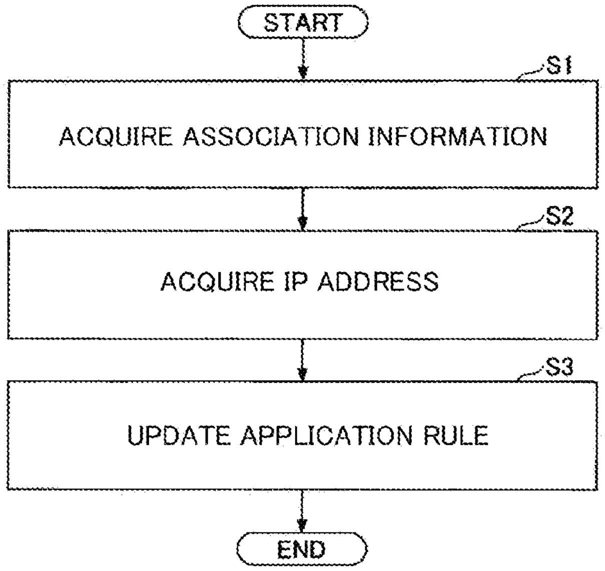
FIG. 6 is a flowchart illustrating a processing procedure.

Using the MAC address of the terminal as the terminal identifier is an example. As a terminal identifier other than the MAC address, IMSI or IMEI of SIM, a terminal host name, or the like may be used. It is possible to link these identifiers other than the MAC address with a protocol for managing the IP address (Radius, IoT Device Discovery, or the like). Hereinafter, description will be given according a procedure of FIG. 6. The procedure illustrated in FIG. 6 is repeatedly executed, for example, at predetermined time intervals.

<S1>

In S1, the process 110 acquires association information of a MAC address of the terminal and a connection destination (I/F name, or the like) of the terminal from the orchestrator 200, and stores the acquired association information in the terminal information DB 120. FIG. 8 illustrates an example of information stored in the terminal information DB 120. In FIG. 8, it is shown that, for example, in an entry 100, a MAC address of a certain terminal is associated with tun0.

<S2>

In S2, the process 110 acquires the corresponding IP address by referring to the address information DB 130 for each of the terminal identifiers (MAC addresses) stored in the terminal information DB 120. That is, the IP address issued to the terminal having the terminal identifier (MAC address) is acquired. Acquiring an IP address by referring to the address information DB 130 is an example.

<S3>

The process 110 updates the application rule for the packet processing for a certain terminal when it is detected that the IP address acquired in S2 differs from the IP address acquired in the previous S2. Specifically, for example, the routing rule of the PBR is updated.

For example, regarding the terminal A, in a case in which a routing rule "a packet having transmission source IP address=AAAA.BBBB.CCCC.DDDD is transmitted from a tun0" is set in the routing unit 140, when the process 110 detects that an IP address of the terminal A has been changed from "AAAA.BBBB.CCCC.DDDD" to "AAAA.BBBB.CCCC.EEEE", the process 110 updates the routing rule with "the packet having the transmission source IP address=AAAA.BBBB.CCCC.EEEE is transmitted from tun0".

Hereinafter, the example in which the method of acquiring the association information between the IP address and the terminal identifier (here, the MAC address) in the above-described configuration has been described more specifically will be described as Examples 1 and 2.

Example 1

Figure 9:
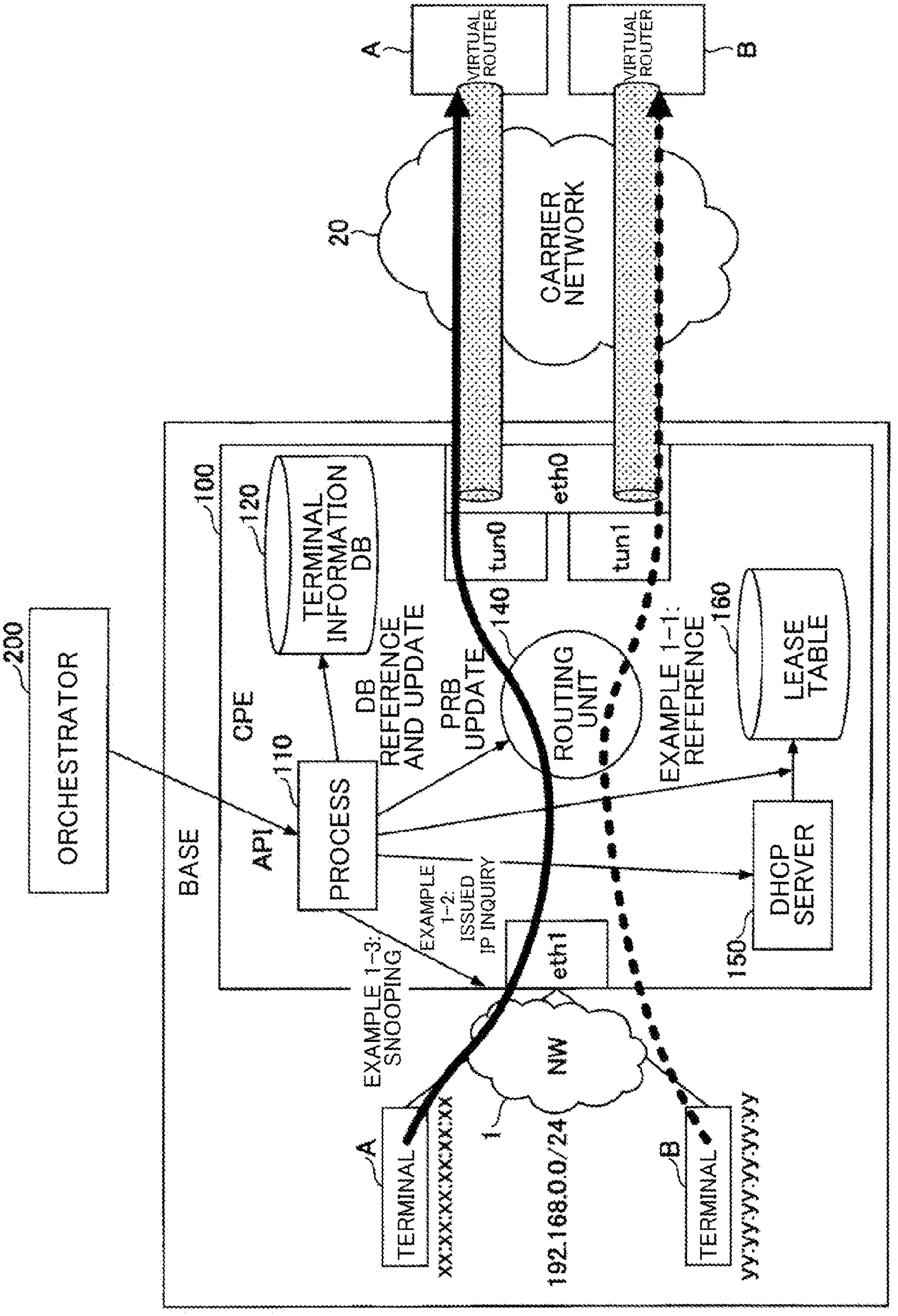
FIG. 9 is a diagram illustrating Example 1.

FIG. 9 illustrates a configuration example of a communication system in Example 1. As illustrated in FIG. 9, the CPE 100 of Example 1 includes a DHCP server 150 and a lease table 160, in addition to each I/F, the process 110, the terminal information DB 120, and the routing 140 described with reference to FIG. 5. The lease table 160 is an example of the address information DB 130 illustrated in FIG. 5.

FIG. 9 illustrates, as an example, an example in which the CPE 100 includes the DHCP server 150 and the lease table 160. In Example 1, the DHCP server 150 (and the lease table 160) may be included outside the CPE 100.

In Example 1, the process 110 includes acquiring the IP address issued to the terminal from the MAC address by using a function of the DHCP server 150, and updating the PBR when the IP address is changed. More specifically, there are Examples 1-1 to 1-3 below.

Example 1-1

In Example 1-1, as shown as "Example 1-1" in FIG. 9, the process 110 monitors the lease table 160 of the DHCP server 150 to determine whether or not there is a change in the issued IP address with respect to each MAC address. FIG. 10 illustrates an example of information stored in the lease table 160.

Example 1-2

In Example 1-2, the DHCP server 150 may be inside the CPE 100 or may be outside the CPE 100. However, Example 1-2 depends on a function of the DHCP server 150. Here, it is assumed that the DHCP server 150 has the following functions.

In Example 1-2, the process 110 includes acquiring the IP address corresponding to the MAC address of the terminal by using the API provided by the DHCP server 150. The process 110 may refer to settings of a fixed IP of the DHCP.

Further, when the DHCP server 150 issues the IP address to the terminal, the process 110 may notify the MAC address of the terminal and the issued IP address from the DHCP server 150.

Example 1-3

In Example 1-3, the DHCP server 150 may be inside the CPE 100 or may be outside the CPE 100. In Example 1-3, the process 110 detects the issuance of the IP address to the terminal by snooping messages transmitted and received between the DHCP server 150 and the terminal (DHCP client).

Figure 11:
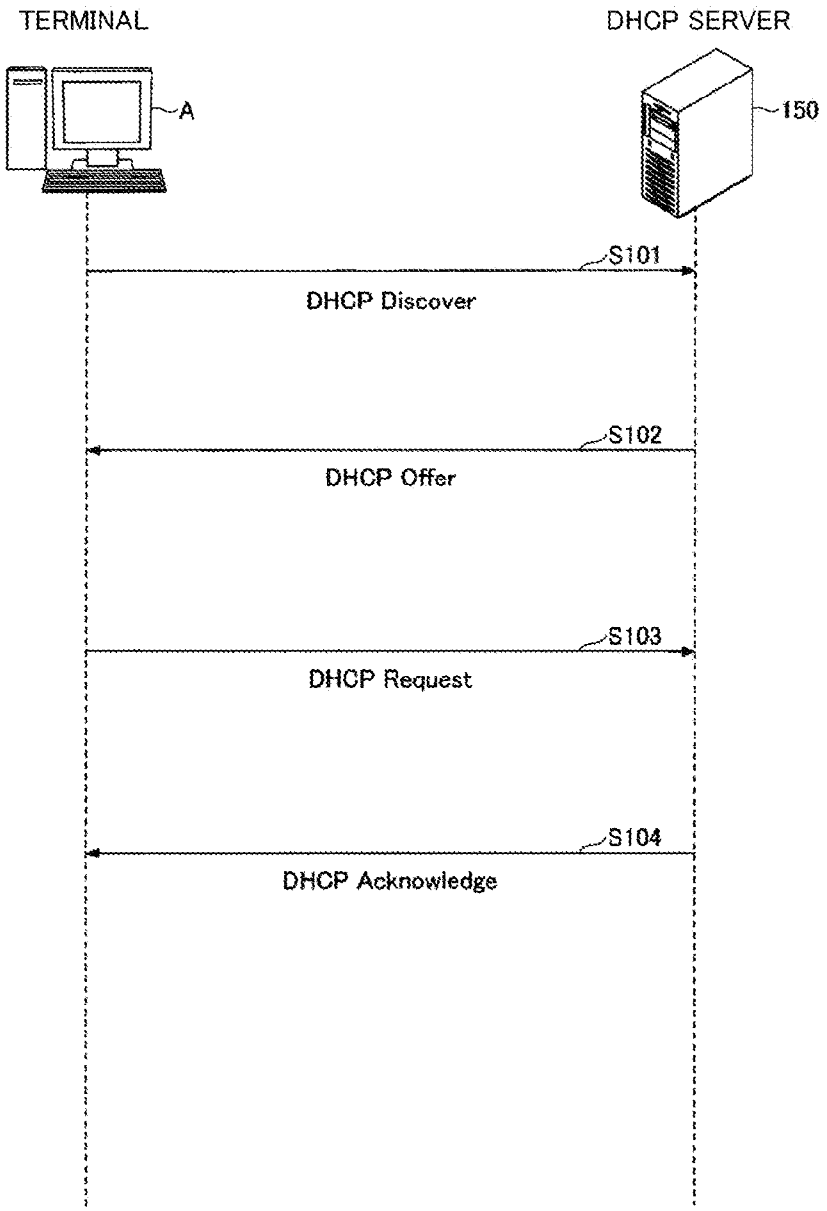
FIG. 11 is a diagram illustrating an example of a method of monitoring DHCP issuance.

FIG. 11 illustrates an example of exchanging messages between the terminal A and the DHCP server 150.

In S101, the terminal A transmits DHCP-Discovery by broadcasting. The DHCP server 150 that has received the DHCP-Discovery transmits DHCP-Offer including a proposed IP address to the terminal A in S102.

In S103, the terminal A transmits a DHCP-Request to the DHCP server 150 so that the proposed IP address can be issued. In S104, the DHCP server 150 transmits a DHCP-Acknowledge to the terminal A to approve the IP to approve the IP issuance.

For example, when the process 110 detects that DHCP-Discovery is transmitted from a certain terminal, the process 110 monitors the DHCP-Request transmitted from the terminal and acquires a request IP address included in the DHCP-Request as the IP address issued to the terminal using the DHCP server 150 in S103.

Example 2

Figure 12:
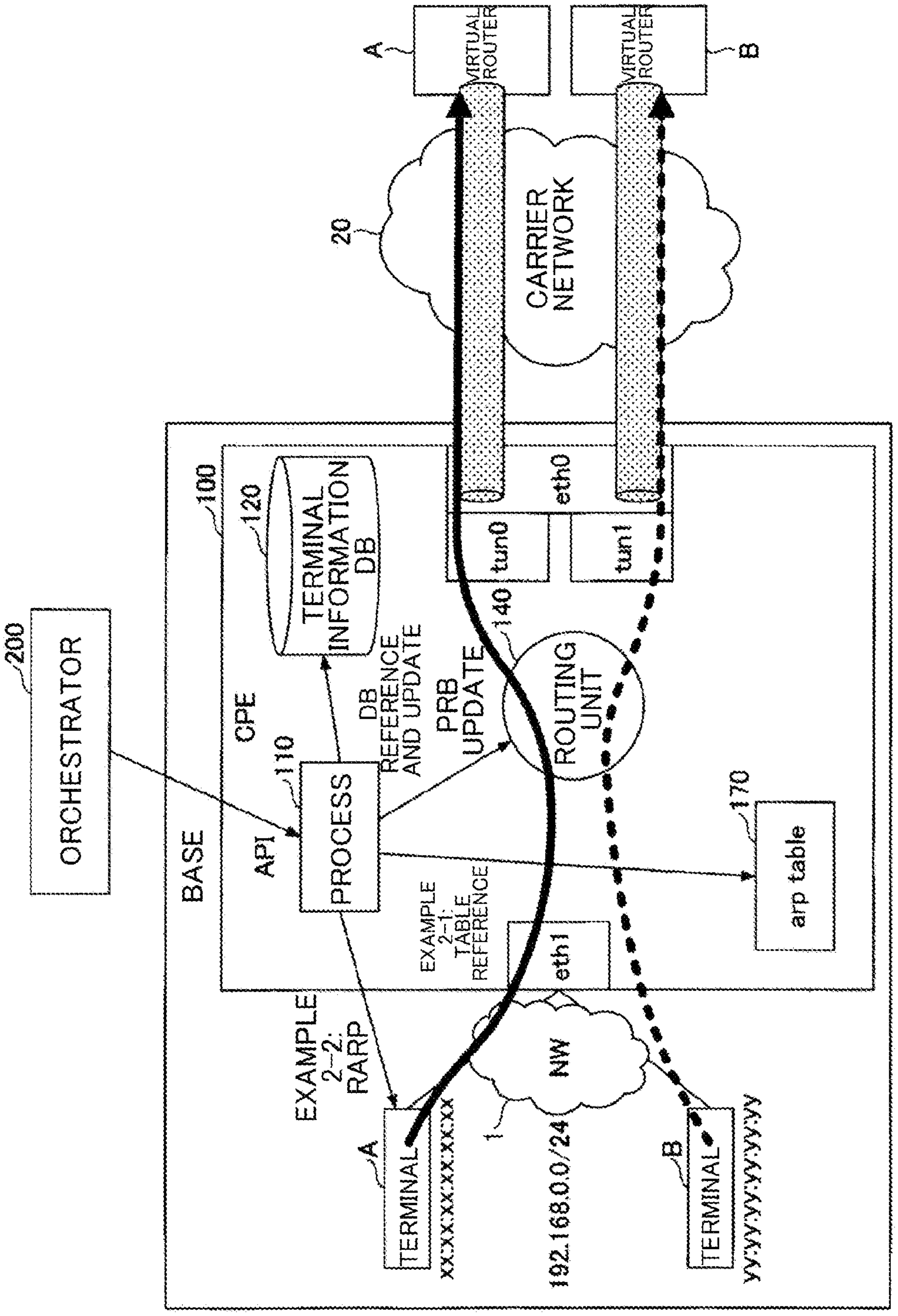
FIG. 12 is a diagram illustrating Example 2.

FIG. 12 illustrates a configuration example of a communication system in Example 2. As illustrated in FIG. 12, a CPE 100 of Example 2 includes an ARP table 170, in addition to each I/F, the process 110, the terminal information DB 120, and the routing 140 described with reference to FIG. 5. The ARP table 170 is an example of the address information DB 130 illustrated in FIG. 5.

FIG. 13 illustrates an example of information stored in the ARP table 170. As illustrated in FIG. 13, the ARP table 170 stores an I/F, an IP address, and a MAC address in association with each other. For example, when the routing unit 140 of the CPE 100 transmits the IP packet to a terminal having IP address=192.168.0.10, the routing unit 140 refers to the ARP table 170 to transmit an Ethernet frame (including an IP packet) having a MAC address corresponding to an IP address=192.168.0.10 as a destination from the ethe1.

In Example 2, the process 110 acquires an IP address from the MAC address by using ARP. More specifically, there are Examples 2-1 to 2-2 below.

Example 2-1

In Example 2-1, the process 110 monitors whether or not the IP address corresponding to the MAC address has been updated (changed) by referring to the ARP table 170 with respect to each MAC address in the terminal information DB 120, and updates the routing rule of the PBR when detecting that the IP address has been updated.

Example 2-2

In Example 2-2, the process 110 has a reverse address resolution protocol (RARP) function. The process 110 broadcasts a request including a MAC address whose corresponding IP address is to be known, and when the terminal (or server) receiving the request knows the IP address corresponding to the MAC address, the terminal returns the IP address to process 110.

The process 110 periodically acquires the IP address corresponding to each MAC address in the terminal information DB 120 by using RARP, for example, and updates the routing rule of the PBR when the IP address has been changed.

In a procedure (protocol) in which the IP address can be known from the MAC address, a procedure other than RARP may be used.

Modification Example

In the description so far, the routing unit 140 of the CPE 100 installed in the base performs the packet distribution processing, but such a configuration is an example.

Figure 14:
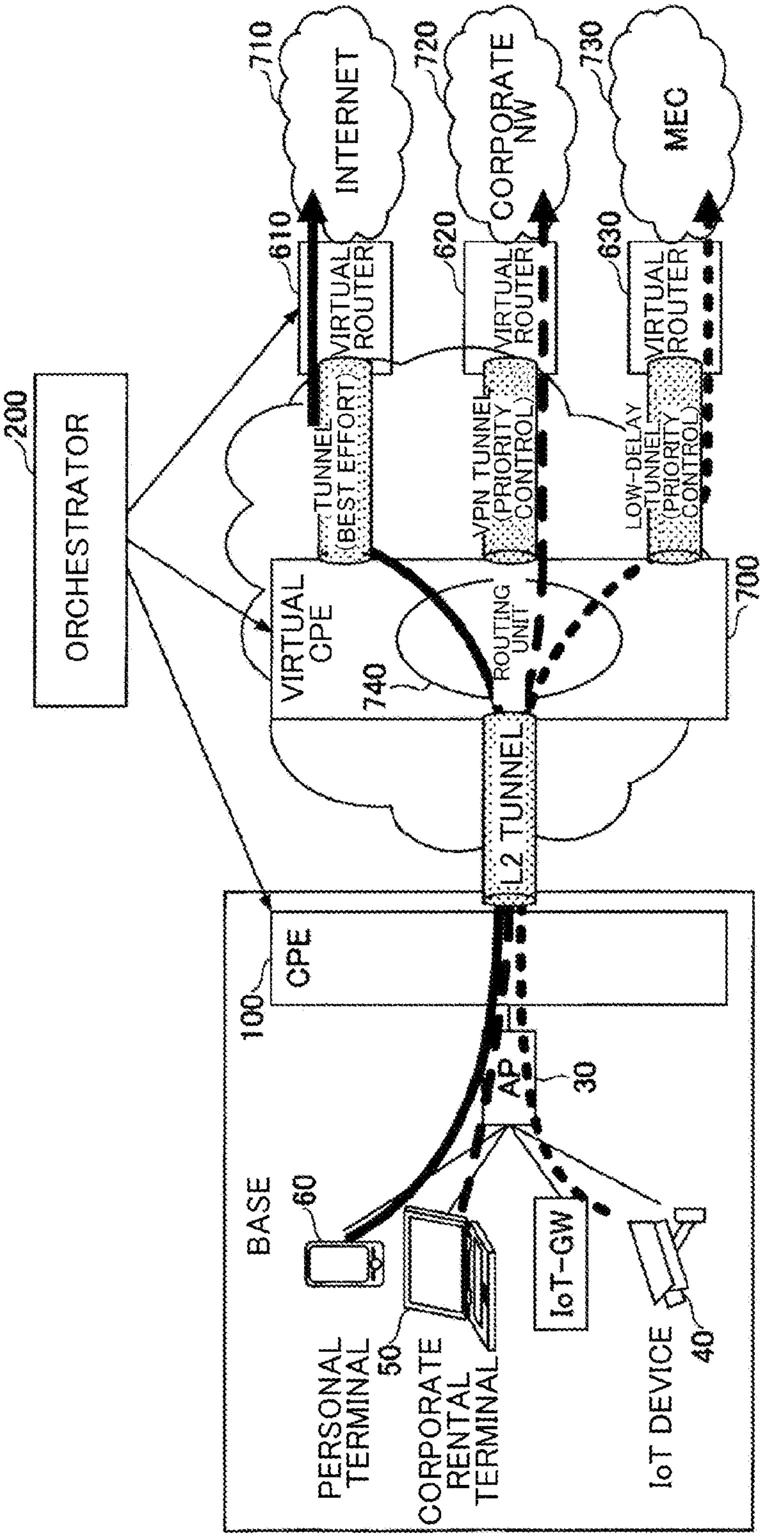
FIG. 14 is a diagram illustrating a modification example.

For example, as illustrated in FIG. 14, a routing unit 740 in a virtual CPE 700 on a cloud service connected to the CPE 100 of the base by a L2 tunnel may perform packet distribution processing. In the example illustrated in FIG. 14, the L2 tunnel is, for example, an L2VPN tunnel such as L2TP or VXLAN, and the virtual CPE 700 exists in the same NW as that for the CPE 100.

In this example, the virtual CPE 700 has the same configuration (a process, a terminal information DB, or the like) as the CPE 100 described so far, and executes the same processing as the CPE 100 described so far. Further, the terminal may have the same configuration (the process, the terminal information DB, or the like) as the CPE 100 described so far, and may include a functional unit that executes the same processing as the CPE 100 described so far.

Devices such as the CPE 100, the virtual CPE 700, and functional units of the terminal that perform packet distribution processing, and setting and changing of the application rule may be collectively referred to as "packet communication devices".

Device Configuration Example

Figure 15:
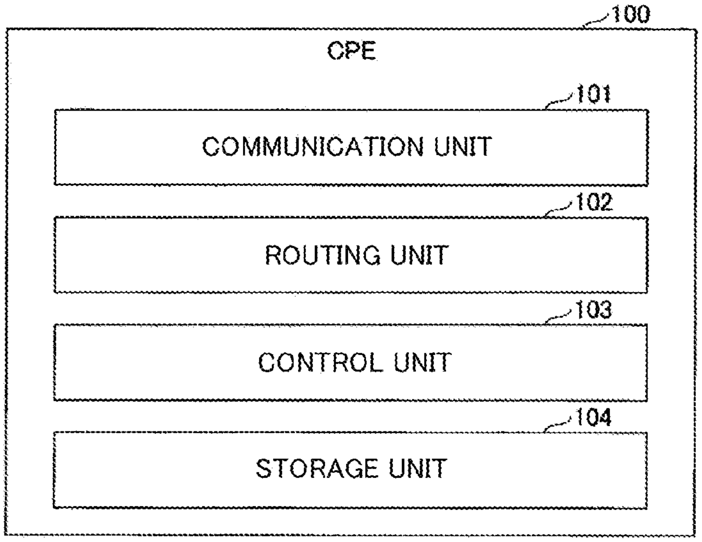
FIG. 15 is a diagram illustrating a functional configuration example of a CPE.

FIG. 15 illustrates an example of a functional configuration of the CPE 100 focusing on functions of the CPE 100. As illustrated in FIG. 15, the CPE 100 includes a communication unit 101, a routing unit 102, a control unit 103, and a storage unit 104. The virtual CPE 700 has a similar configuration.

The communication unit 101 corresponds to the I/F illustrated in FIG. 5 and the like, and performs transmission and reception of packets. The routing unit 102 corresponds to the routing unit 140 illustrated in FIG. 5 and the like, and performs packet distribution processing on the basis of the routing rule of the PBR. The control unit 103 corresponds to the process 110 illustrated in FIG. 5 and the like, checks whether or not the IP address has been changed, and updates the routing rule of the PBR in the routing unit 140 when the IP address has been changed, as described in Examples 1 and 2, and the like. The storage unit 104 corresponds to the terminal information DB 120 and the address information DB 130 illustrated in FIG. 5 and the like, and stores various types of data.

Figure 16:
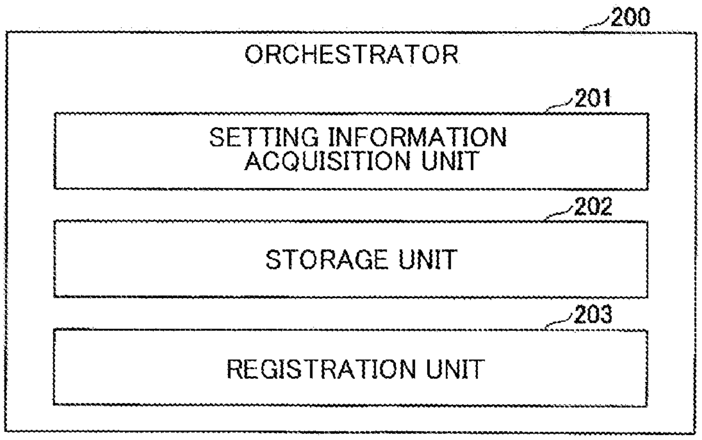
FIG. 16 is a diagram illustrating an example of a functional configuration of an orchestrator.

FIG. 16 is a diagram illustrating a functional configuration example of the orchestrator 200. As illustrated in FIG. 16, the orchestrator 200 includes a setting information acquisition unit 201, a storage unit 202, and a registration unit 203.

The setting information acquisition unit 201 acquires the information set by the user 400 from the portal site 300. The storage unit 202 corresponds to the service order DB 500 illustrated in FIG. 4. The registration unit 203, for example, transmits (registers) the terminal identifier (the MAC address, or the like) and the connection destination (the I/F name, or the like) to the CPE 100 (or the virtual CPE 700) on the basis of information (the terminal identifier (the MAC address, or the like)) acquired by the setting information acquisition unit 201 and information (connection destination (the I/F name, or the like)) read from the storage unit 202.

Hardware Configuration Example

The CPE 100, the virtual CPE 700, the orchestrator 200, and the terminal can all be realized by, for example, causing a computer to execute a program. This computer may be a physical computer or may be a virtual machine.

That is, the device (the CPE 100, the virtual CPE 700, the orchestrator 200, and the terminal) can be realized by executing a program corresponding to processing that is performed by the device, using hardware resources such as a CPU and memory built into the computer. The program can be recorded on a computer-readable recording medium (a portable memory or the like), stored, and distributed. It is also possible to provide the program through a network such as the Internet or e-mail.

Figure 17:
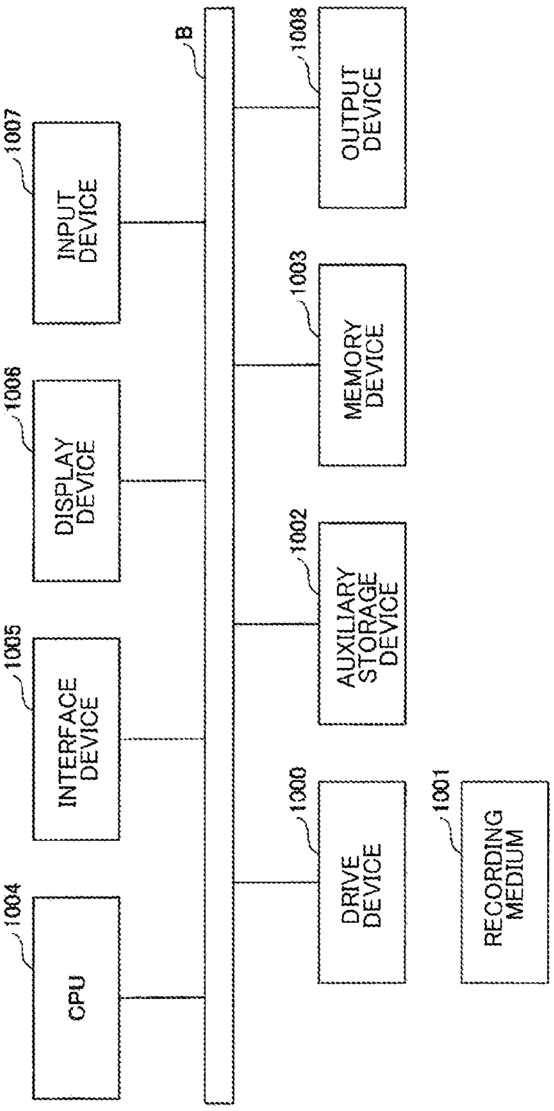
FIG. 17 is a diagram illustrating a hardware configuration example of the device.

FIG. 17 is a diagram illustrating an example of a hardware configuration of the computer. The computer of FIG. 16 includes a drive device 1000, an auxiliary storage device 1002, a memory device 1003, a CPU 1004, an interface device 1005, a display device 1006, an input device 1007, an output device 1008, and the like, which are connected to each other by a bus BS.

A program for realizing processing in the computer is provided by, for example, a recording medium 1001 such as a CD-ROM or a memory card. When the recording medium 1001 having the program stored therein is set in the drive device 1000, the program is installed in the auxiliary storage device 1002 from the recording medium 1001 via the drive device 1000. However, the program does not necessarily have to be installed from the computer-readable recording medium 1001, and may be downloaded from another computer via a network. The auxiliary storage device 1002 stores the installed program and also stores necessary files, data, and the like.

The memory device 1003 reads and stores the program from the auxiliary storage device 1002 when there is an instruction to start the program. The CPU 1004 realizes functions related to the control device according to a program stored in the memory device 1003. The interface device 1005 is used as an interface for connection to a network and functions as a communication unit. The display device 1006 displays a graphical user interface (GUI) or the like according to a program. The input device 1007 is configured of a keyboard, a mouse, buttons, a touch panel, or the like, and is used to input various operation instructions. The output device 1008 outputs a calculation result.

Further, the computer-readable recording medium may also include a recording medium that dynamically holds a program for a short period of time, such as a communication line when the program is transmitted over a network such as the Internet or a communication line such as a telephone line or a recording medium that holds a program for a certain period of time, such as a volatile memory inside a computer system including a server and a client in such a case. Further, the program may be a program for realizing some of the functions.

Effects of Embodiment

When packet processing (tunnel distribution, or the like) for each terminal is realized by the technology according to the present embodiment, the rule is updated while the change of the IP address is constantly followed even when the terminals belong to the same NW, making it possible to perform packet processing or control for each terminal regardless of a scale of the NW or an installation location of the DHCP server or the like.

CONCLUSION OF EMBODIMENT

The preset specification discloses at least a packet communication device, a packet processing rule setting method, and a program described in the following items.

(Item 1)

A packet communication device connected to one or more paths, the packet communication device including:

a routing unit configured to distribute packets received from a terminal to any one of the one or more paths; and a control unit configured to acquire an IP address of the terminal and set an application rule for packet processing in the routing unit on the basis of the IP address.

(Item 2)

The packet communication device according to item 1, in which the application rule for the packet processing is one or a plurality of a routing rule, a filtering rule, and a traffic control rule in PBR.

(Item 3)

The packet communication device according to item 1 or 2, in which the control unit monitors whether or not the IP address corresponding to the terminal identifier of the terminal has been changed by referring to a database holding the IP address and the terminal identifier, and updates the application rule when the IP address has been changed.

(Item 4)

The packet communication device according to item 1 or 2, in which the control unit acquires an IP address corresponding to a terminal identifier of the terminal from a DHCP server, monitors whether or not the IP address has been changed, and updates the application rule when the IP address has been changed.

(Item 5)

The packet communication device according to item 1 or 2, in which the control unit acquires the IP address of the terminal by snooping communication between a DHCP server and the terminal, monitors whether or not the IP address has been changed, and updates the application rule when the IP address has been changed.

(Item 6)

The packet communication device according to item 1 or 2, in which the control unit configured to acquire an IP address corresponding to a terminal identifier of the terminal using RARP, monitor whether or not the IP address has been changed, and update the application rule when the IP address has been changed.

(Item 7)

A packet processing rule setting method executed by a packet communication device connected to one or more paths, in which the packet communication device includes a routing unit configured to distribute a packet received from a terminal to any one of the one or more paths, and the packet processing rule setting method includes acquiring an IP address of the terminal, and setting an application rule for packet processing in the routing unit on the basis of the IP address.

(Item 8)

A program for causing a computer to function as each unit in the packet communication device according to any one of items 1 to 6.

Although the embodiment has been described above, the present invention is not limited to such a specific embodiment, and various modifications and changes can be made within the scope of the gist of the present invention described in the claims.

REFERENCE SIGNS LIST

10, 100 CPE
20 Carrier network
30 AP
40 to 60 Terminal
101 Communication unit
102 Routing unit
103 Control unit
104 Storage unit
110 Process
120 Terminal information DB
130 IP address information DB
11, 140, 740 Routing unit
150 DHCP server
160 Lease table
170 ARP table
200 Orchestrator
201 Setting information acquisition unit
202 Storage unit
203 Registration unit
300 Portal site
400 User
500 Service order DB
610 to 630 Virtual router
700 Virtual CPE
710 Internet
720 Corporate NW
730 MEC
1000 Drive device
1001 Recording medium
1002 Auxiliary storage device
1003 Memory device
1004 CPU
1005 Interface device
1006 Display device
1007 Input device
1008 Output device

The invention claimed is:

1. A packet communication device connected to one or more paths, the packet communication device comprising a processor configured to execute operations comprising:

distributing packets received from a terminal to a path of the one or more paths;

acquiring an IP address of the terminal by snooping communication between a Dynamic Host Configuration Protocol server and the terminal, wherein the IP address corresponds to a terminal identifier of the terminal using Reverse Address Resolution Protocol;

creating an application rule for packet processing based on the IP address;

determining whether or not the IP address has been changed; and updating the application rule when the IP address has been changed.

2. The packet communication device according to claim 1, wherein the application rule for the packet processing comprises at least one of a routing rule, a filtering rule, or a traffic control rule to perform policy-based routing for the packets received from the terminal.

3. The packet communication device according to claim 1, the processor further configured to execute operations comprising:

determining whether or not the IP address corresponding to a terminal identifier of the terminal has been changed according to a database storing the IP address and the terminal identifier; and updating the application rule when the IP address has been changed.

4. The packet communication device according to claim 1, the processor further configured to execute operations comprising:

receiving the IP address corresponding to a terminal identifier of the terminal from a Dynamic Host Configuration Protocol server;

determining whether or not the IP address has been changed; and updating the application rule when the IP address has been changed.

5. A method for generating a rule for processing a packet, comprising:

distributing a packet received from a terminal to one or more paths for a packet communication;

acquiring an IP address of the terminal by snooping communication between a Dynamic Host Configuration Protocol server and the terminal, wherein the IP address corresponds to a terminal identifier of the terminal using Reverse Address Resolution Protocol;

creating an application rule for packet processing based on the IP address;

determining whether or not the IP address has been changed; and updating the application rule when the IP address has been changed.

6. A computer-readable non-transitory recording medium storing computer-executable program instructions that when executed by a processor cause a computer to execute operations comprising:

distributing a packet received from a terminal to one or more paths for a packet communication;

acquiring an IP address of the terminal by snooping communication between a Dynamic Host Configuration Protocol server and the terminal, wherein the IP address corresponds to a terminal identifier of the terminal using Reverse Address Resolution Protocol;

creating an application rule for packet processing based on the IP address;

determining whether or not the IP address has been changed; and updating the application rule when the IP address has been changed.

7. The packet communication device according to claim 2, the processor further configured to execute operations comprising:

determining whether or not the IP address corresponding to a terminal identifier of the terminal has been changed according to a database storing the IP address and the terminal identifier; and updating the application rule when the IP address has been changed.

8. The method according to claim 5, wherein the application rule for the packet processing includes is at least one of a routing rule, a filtering rule, or a traffic control rule to perform policy-based routing for the packets received from the terminal.

9. The method according to claim 5, further comprising:

determining whether or not the IP address corresponding to a terminal identifier of the terminal has been changed according to a database storing the IP address and the terminal identifier; and updating the application rule when the IP address has been changed.

10. The method according to claim 5, further comprising:

receiving the IP address corresponding to a terminal identifier of the terminal from a Dynamic Host Configuration Protocol server;

determining whether or not the IP address has been changed; and updating the application rule when the IP address has been changed.

11. The method according to claim 8, further comprising:

determining whether or not the IP address corresponding to a terminal identifier of the terminal has been changed according to a database storing the IP address and the terminal identifier; and updating the application rule when the IP address has been changed.

12. The computer-readable non-transitory recording medium according to claim 6, wherein the application rule for the packet processing comprises at least one of a routing rule, a filtering rule, or a traffic control rule to perform policy-based routing for the packets received from the terminal.

13. The computer-readable non-transitory recording medium according to claim 6, the computer-executable program instructions when executed further cause the computer to execute operations comprising:

determining whether or not the IP address corresponding to a terminal identifier of the terminal has been changed according to a database storing the IP address and the terminal identifier; and updating the application rule when the IP address has been changed.

14. The computer-readable non-transitory recording medium according to claim 6, the computer-executable program instructions when executed further cause the computer to execute operations comprising:

receiving the IP address corresponding to a terminal identifier of the terminal from a Dynamic Host Configuration Protocol server;

determining whether or not the IP address has been changed; and updating the application rule when the IP address has been changed.

* * * * *